United States Patent
Reeb (10) Patent No.: US 8,321,402 B2
(45) Date of Patent: Nov. 27, 2012

(54) GENERIC APPLICATION INTERFACE FOR SEARCHING

(75) Inventor: Andreas Reeb, Schifferstadt (DE)

(73) Assignee: SAP AG, Walldorf (DE)

( * ) Notice: Subject to any disclaimer, the term of this patent is extended or adjusted under 35 U.S.C. 154(b) by 635 days.

(21) Appl. No.: 11/956,694

(22) Filed: Dec. 14, 2007

(65) Prior Publication Data

US 2008/0147647 A1 Jun. 19, 2008

Related U.S. Application Data

(60) Provisional application No. 60/875,012, filed on Dec. 14, 2006.

(51) Int. Cl.
*G06F 17/30* (2006.01)
(52) U.S. Cl. ........ 707/713; 707/781; 707/783; 707/784; 707/785
(58) Field of Classification Search .................. 707/713, 707/781, 783, 784
See application file for complete search history.

(56) References Cited

U.S. PATENT DOCUMENTS

| | | | |
|---|---|---|---|
| 5,889,674 A * | 3/1999 | Burdick et al. ............... 700/121 |
| 6,621,505 B1 * | 9/2003 | Beauchamp et al. ......... 715/764 |
| 7,506,045 B1 * | 3/2009 | Christensen et al. ......... 709/224 |
| 2002/0082871 A1 * | 6/2002 | Younger et al. ................... 705/4 |
| 2004/0088158 A1 * | 5/2004 | Sheu et al. ......................... 704/9 |
| 2004/0122936 A1 * | 6/2004 | Mizelle et al. ................ 709/224 |
| 2004/0181513 A1 * | 9/2004 | Henderson et al. ............... 707/3 |
| 2004/0267595 A1 * | 12/2004 | Woodings et al. ................ 705/9 |
| 2005/0076023 A1 * | 4/2005 | Wu et al. ............................ 707/3 |
| 2005/0251420 A1 * | 11/2005 | Dixon et al. ...................... 705/2 |
| 2005/0262549 A1 * | 11/2005 | Ritt et al. .......................... 726/1 |
| 2007/0049304 A1 * | 3/2007 | Rana et al. ..................... 455/466 |
| 2007/0143214 A1 * | 6/2007 | Colgrave ......................... 705/51 |
| 2007/0192166 A1 * | 8/2007 | Van Luchene ................. 705/10 |
| 2007/0299813 A1 * | 12/2007 | Subramaniam et al. .......... 707/2 |
| 2011/0113358 A1 * | 5/2011 | Nielsen et al. ................ 715/765 |

* cited by examiner

*Primary Examiner* — Hanh Thai
(74) *Attorney, Agent, or Firm* — Kenyon & Kenyon LLP (57) ABSTRACT

Systems and methods for creating user interfaces for a common application such as a web browser from custom search definitions are presented. The systems and methods may enforce the security of a database. The systems and methods may provide for creating custom search definitions. The systems and methods may require a user to be authenticated before performing the search and the search may be conducted on a centralized database. The systems and methods may create user interfaces that may be executed on many different platforms.

20 Claims, 6 Drawing Sheets

GENERIC APPLICATION INTERFACE FOR SEARCHING

CROSS-REFERENCE TO RELATED APPLICATIONS

This application claims the benefit of and priority to U.S. Provisional Patent Application No. 60/875,012, to Andreas Reeb, filed Dec. 14, 2006, entitled "Generic Application (WD ABAP) for an Employee Search Using SAP Query," which is hereby incorporated by reference in its entirety.

BACKGROUND

The present invention provides systems and methods for building custom user interfaces for performing searches on a database based on a role of a user and based on custom search definitions. The systems and methods may require a user to be authenticated before performing the search and the search may be conducted on a centralized database. The user interfaces may be created for a common application such as a web browser. The systems and methods may provide for building custom search definitions.

Databases for organizations and other information storage mechanisms often contain vast amounts of information. Each database entry may have hundreds or thousands of fields that may be searched. For example in an employee database of an organization, each employee may have hundreds or thousands of fields, e.g. the employee's start date, birth day, birth month, birth year, organizational unit, salary, home telephone, work telephone, an entry for each annual performance review, etc. However, the users of the database often need to search only a few of the fields to accomplish their tasks. For example, an administrative assistant may need only to search the fields for organizational unit, birth day, and birth month, to create a chart for celebrating birthdays in an organizational unit. As another example, a human resources director may need to search the fields of the employee database for annual performance reviews to create a report for how well employees has been performing over the last several years. As illustrated by these two examples, the users of the database may have different needs for searching the database. Further, the users of the database may wish to customize searches themselves for confidentiality reasons or because they want to immediately perform the search. The database support staff may have to spend much time creating and changing interfaces to support the needs of the organization to search the database.

Databases for organizations are often centralized to avoid the problems of maintaining consistent data for multiple databases for when data is added, changed, or deleted from one of the databases. One problem with a centralized database is that some of the data in the database may need to be kept secure from some users. For example, administrative assistants should not be able to search the employee field for their salary or the employee field for their performance review. The security mechanisms used to secure the database would therefore restrict portions of the centralized database depending on the roles used to access the centralized database.

Another problem with a centralized database is that the users of the database may want to search the database from many locations, such as their home office, their work office, their hotel rooms, etc. However, the tools provided by a centralized database vendor may not provide for accessing the centralized database outside the network where the centralized database resides.

Thus there is a need in the art for systems and methods for creating user interfaces for a common application such as a web browser to access centralized databases of organizations so that the user interfaces are easily accessible from a wide range of platforms. The systems and methods need to enforce the security of the centralized database regarding the roles of different users and need to provide an easy method for creating and changing the interfaces.

DETAILED DESCRIPTION

The systems and methods provide for creating user interfaces for a common application such as a web browser from custom search definitions. The systems and methods may enforce the security of the database. The systems and methods may provide for creating custom search definitions. The systems and methods may provide for creating user interface for execution on many different platforms.

Figure 1:
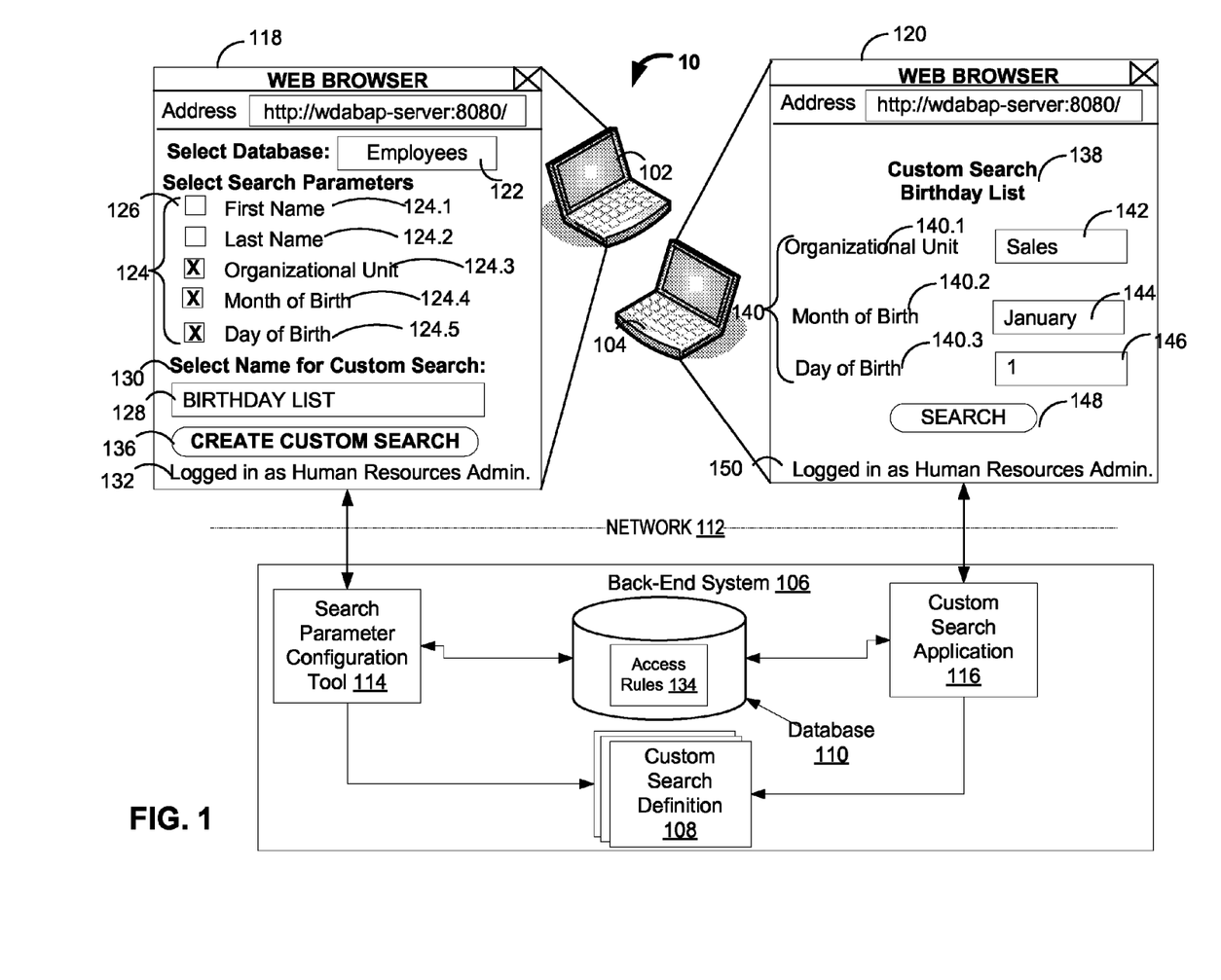
FIG. 1 illustrates an overview of an embodiment for building user interfaces for performing custom searches of a database.

FIG. 1 illustrates an overview of an embodiment for a system 10 for building user interfaces for performing custom searches of a database 110. Illustrated in FIG. 1 is a computer 102 displaying in a web browser 118 an interface for creating custom search definitions 108, a computer 104 displaying in a web browser 120 an interface for performing a custom search of the database 110 where the custom search is based on a custom search definition 108, a back-end system 106 which may be one or more computers such as servers, and a network 112 for enabling communications between the computers 102, 104 and the back-end system 106. The back-end system 106 includes a search parameter configuration tool 114 which enables a user (not illustrated) to build custom search definitions 108, a custom search application 116 which builds user interfaces from custom search definitions 108, and a database 110 which may be a large centralized database for an organization.

As illustrated a user is currently creating a custom search definition 108 using the web browser 118 being displayed on computer 102. The user has selected "Employees" 122 as the selection for which database 110 to perform the custom search on. The selected database "Employees" 122 may be a part of database 110. After the user selected the database 110 for which database 110 to perform the custom search on, the search parameter configuration tool 114 received "Employees" 122 and queried the database 110 to determine which fields 124 were available to search for the database "Employees" 122. The search parameter configuration tool 114 may then have excluded fields 124 that the user did not have permission to view. The search parameter configuration tool 114 may determine which fields the user has permission to view based on the role 132 of the user, which as illustrated is "Human Resources Admin" 132, and based on access rules 134 that may be used to determine which of the fields the user may view. The search parameter configuration tool 114 then sent a list of the fields 124 that could be searched to the computer 102 for displaying to the user. Check boxes 126 enable the user to select which fields to include in a custom search definition 108. As illustrated the user has selected "Organizational Unit" 124.3, "Month of Birth" 124.4, and "Day of Birth" 124.5 by placing an "X" in the check boxes 126 next to the field 124. The user has typed in "Birthday List" 128 for the user interface element 130 for entering the name of the custom search definition 108. The name 128 of the custom search definition is used to access the custom search definitions 108. Once the user selects "CREATE CUSTOM SEARCH"136 the search parameter configuration tool 114 will take the information and create a custom search definition 108; however, the custom search definition 108 is not complete until the user also selects which of the fields 124 should be present in results user interface. In an embodiment, a custom search definition 108 is created using a special purpose application that is executed on the back-end system 106.

As illustrated a user is currently performing a custom search of "Employees" database 110 using web browser 120 being displayed on computer 104. The custom search application 116 has retrieved a custom search definition 108 with the name "Birthday List" 138. The "Birthday List" 138 custom search definition 108 defined three fields 140 as parameters for performing a custom search. The custom search application 116 created an search parameter user interface which was an HTML document that included the fields 140 defined in the custom search definition 108 and transmitted the HTML document to computer 104 for executing by the web browser 120. The web browser 120 executed the HTML to create the custom search user interface that is being displayed in the web browser 120. For ease of explanation, the custom search "Birthday List" 138 is based on the customer search definition 108 that is being defined in web browser 118. In web browser 120 the user has input values for "Organizational Unit" 140.1 with "Sales" 142, "Month of Birth" with "January", and "Day of Birth" 140.3 with "1" 146. The user is logged in as "Human Resources Admin" 150 as the user role 150. The role 150 defines which of the fields in the database 110 the user may view based on the access rules 134. When the user selects the button "SEARCH" 148, the values for the search parameters 142, 144, and 146 are transmitted to the custom search application 116 over network 112. The custom search application 116 builds a query for accessing the database 110 based on the search parameters 140 and based on the result fields defined in the custom search definition 108. In this embodiment, the custom search application 116 then builds a results user interface in HTML for the computer 104 to display the results of the custom search to the user.

Figure 2:
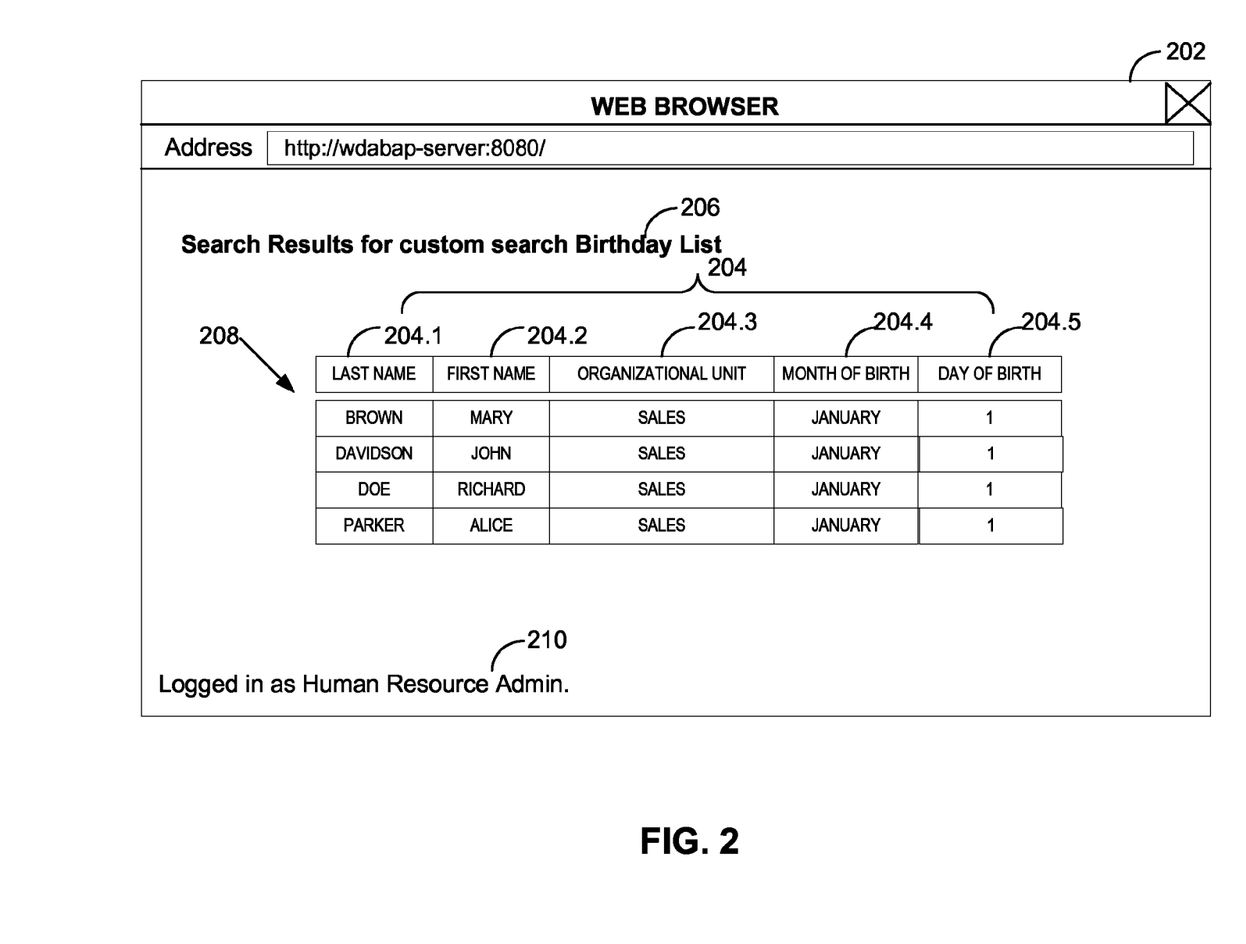
FIG. 2 illustrates one embodiment of a results field user interface being displayed on a web browser

FIG. 2 illustrates one embodiment of a results field user interface being displayed on a web browser 202 by a computer (not illustrated). Continuing with the example of FIG. 1, the results user interface includes a table 208 for displaying the results of the custom search that is defined in FIG. 1 in the web browser 120. The table 208 displays four employees in "Organizational Unit" 204.3 "SALES" that have a birthday on "January" 204.4 "1" 204.5. The five columns 204 are defined in the custom search definition 108 for which columns to return as a result of the custom search "Birthday List" 206. The role of the user "Human Resource Admin" 210 may have been used by the custom search application 116 to restrict access to columns that may be in the custom search definition 108.

Figure 3:
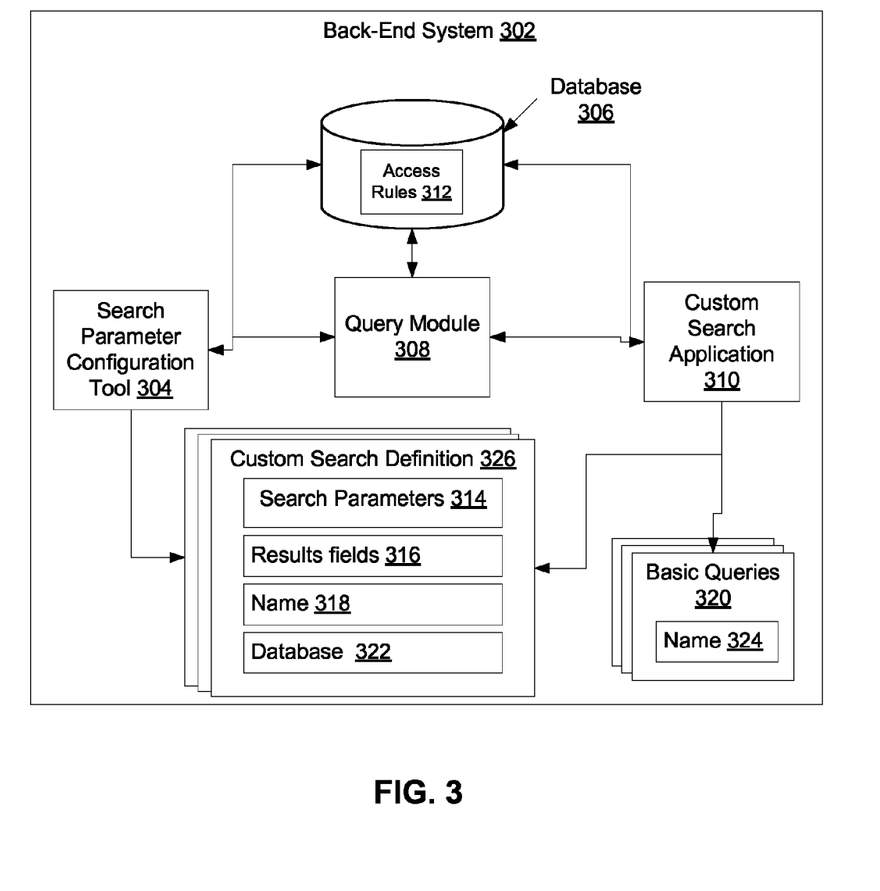
FIG. 3 illustrates an overview of an embodiment for an architecture for a system for performing custom searches of a database.

FIG. 3 illustrates an overview of an embodiment for an architecture for a system for performing custom searches of a database. The back-end system 302 may include the search parameter configuration tool 304, the database 306, the query module 308, the custom search application 310, the custom search definitions 326, and the basic set of queries 320. The back-end system 302 may be a computer system such as one or more servers. The search parameter configuration tool 304 may be a software module executing on the back-end system 302. The search parameter configuration tool 304 enables a user (not illustrated) to build custom search definitions 312. The search parameter configuration tool 304 may convert basic set of queries 320 to custom search definitions 312. The database 306 may be a centralized database for storing the data of an organization. The database 306 may include access rules 312 which may be data or executable code that define which of the fields of the database may be viewed by a user based on the role of the user. The custom search application 310 may be a software module executing on the back-end system 302. The custom search application 310 is for building custom search user interfaces based on a role of the user and either a custom search definition 326 or a basic query 320. The query module 308 may be a software module executing on the back-end system 302. The query module 308 may be for the search parameter configuration tool 304 and the custom search application 310 to call to create queries for the database 306. The query module 308 may be provided by a commercial vendor with software for the database 306. The custom search definition 326 may be data that is stored in the database 302 and may include search parameters 314 which may be fields defined for the database 306. The search parameters 314 are the fields of the database that will be searched by the custom search. The custom search definition 326 may also include the results fields 316 which are the fields from the database that should be displayed to the user as results for running the custom search. The custom search definition 326 may also include the name 318 which is the name 318 given to the custom search and is used for retrieving the custom search definition 326. The custom search definition 326 may also include the database 322 to perform the search on. Basic queries 320 may be defined queries for the database 306 that may have been included with the database or may have been defined by an application other than the search parameter configuration tool 304. The basic queries 320 may include a name 324 that may be used by the custom search application 310 to access the basic queries 320. The basic queries 320 may include other information that is used by custom search application 310 to build user interfaces for custom searches.

Figure 4:
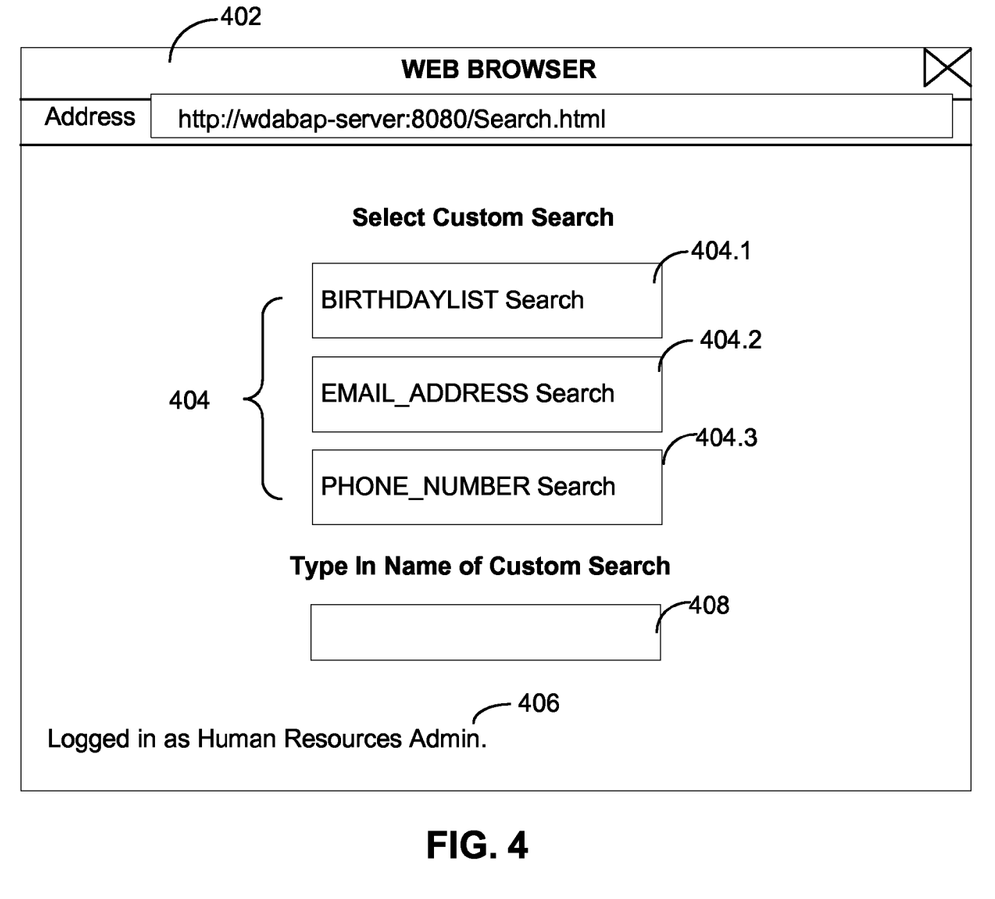
FIG. 4 illustrates one embodiment of a user interface for accessing custom searches.

FIG. 4 illustrates one embodiment of a user interface for accessing custom searches. Displayed on the web browser 402 are a selection of three custom searches 404 that a user may select from or the user may input the name of the custom search in an input element 408. Each of the custom searches 404 corresponds to a custom search definition that defines the custom search 304. As an example, if the user were to select button 404.1 then the user would be presented with the user interface that is displayed in FIG. 1 element 120. The web browser 402 will send a request to the custom search application that includes the name of the custom search 404.1 "Birthday List", and may include other information including a selected database and the role of the user "Human Resources Admin" 406. In an embodiment, the database may be determined by the name of the custom search 404. In an embodiment, the role of the user is determined by the custom search application. The user may input the name of the custom search in the input element 408. For example, if the user input "Birthday List", then the web browser 402 will send the name "Birthday List" to the custom search application, and then the user will be presented with the user interface that is displayed in FIG. 1 element 120.

Figure 5:
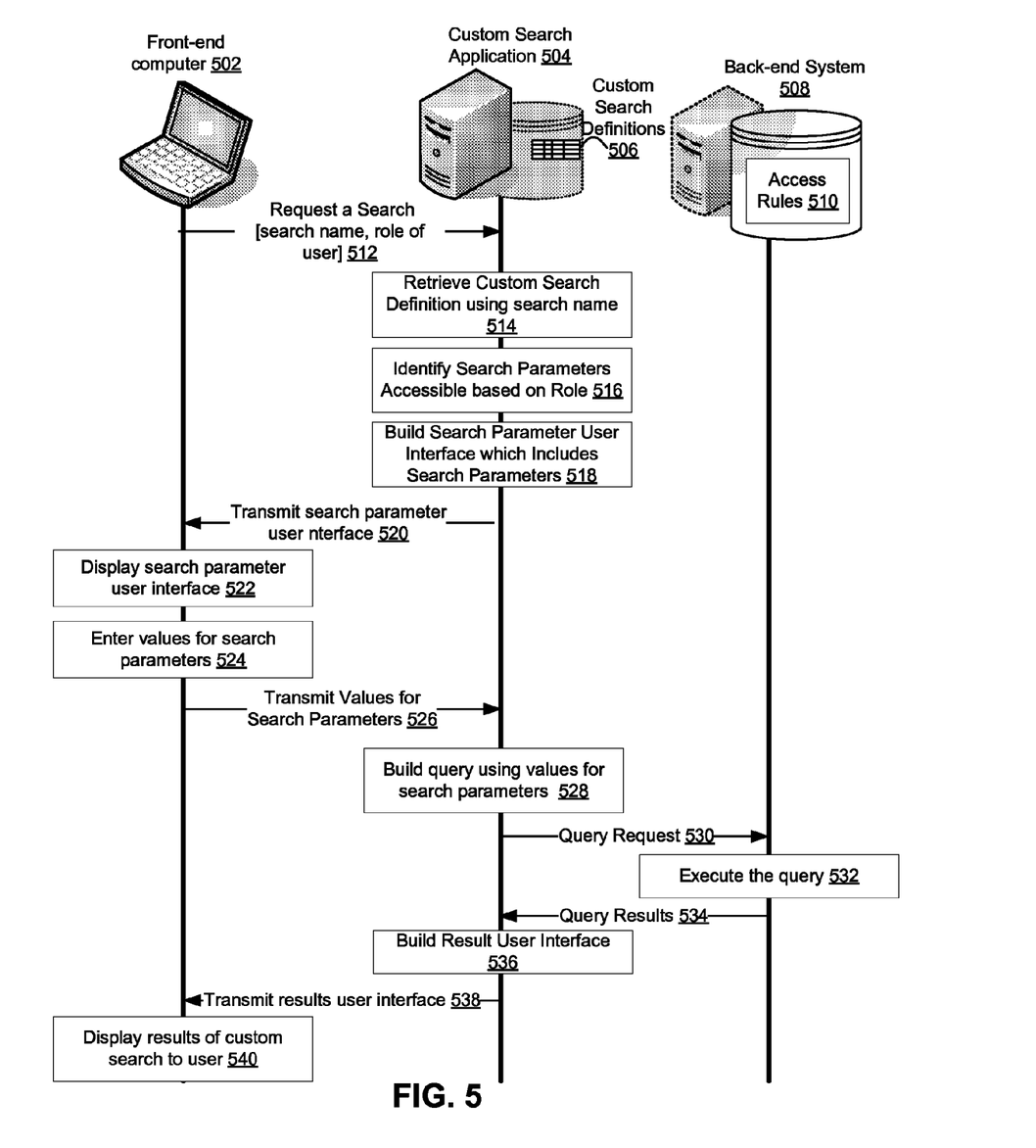
FIG. 5 illustrates one embodiment of a method for building user interfaces for performing custom searches of a database.

FIG. 5 illustrates one embodiment of a method for building user interfaces for performing custom searches of a database. Illustrated are a front-end computer 502 which may be used by a user for performing a custom search, a custom search application 504 which in this embodiment may be an application executing on a computer system that may include custom search definitions 506, a back-end system 508 that may be a server and may include access rules 50 which define which fields of the database may be viewed by the user based on a role of the user. The flow begins at 512 with the front-end computer 502 sending a request to conduct a custom search with parameters of a search name and a role of the user. In some embodiments the role of the user may not be included with the request. The flow continues at 514 with the custom search application 504 retrieving the custom search definition using the search name included with the request to conduct a custom search. The flow continues at 516 with identify search parameters accessible based on role 516. The custom search application 504 will check the fields that are included in the retrieved custom search definitions 506 and exclude any fields that the user does not have the permission to view. The custom search application 504 may have to call the back-end system to determine which fields the user may view. The flow continues at 518 with build search parameter user interface which includes search parameters. An example user interface being displayed is at FIG. 1 element 120. The custom search application 504 may build the user interface in other languages other than HTML. The flow continues at 520 with transmit search parameter user interface to the front-end computer 502. The custom search application 504 may transmit the search parameter user interface over a communications network. The flow continues at 522 with display search parameter use interface 522. The front-end computer 502 may execute the search parameter user interface with a web browser and display the result to the user. The flow continues at 524 with enter values for search parameters. The front-end computer 502 may accept values from a user for the displayed search parameters. The flow continues at 526 with transmit the values for the search parameters. The front-end computer 502 may transmit the values using the same communications network used by the custom search application 504, or the front-end computer 502 may use a different communications network. The flow continues at 528 with build query using values for search parameters 528. The flow continues at 530 with transmitting the query to the back-end system 508. The flow continues at 532 with executing the query. The back-end system 508 may directly execute the query or in another embodiment there may be a module that translate the query. The query module 308 of FIG. 3 may be an example of a module that may translate the query. The flow continues at 534 with transmitting the query results to the custom search application 504. The flow continues at 536 with build result user interface. The custom search application 504 may query the back-end system to determine using the access rules if each of the fields may be viewed by the user based on the role of the user. If a field may not be viewed by the user, then the custom search application will not include the field in the result user interface. The custom search application 504 may build the result user interface in HTML. The flow continues at 538 with transmit results user interface. The flow continues at 540 with display results user interface. The front-end computer may execute the results user interface with a web browser. FIG. 2 is an example of a front-end computer displaying a results user interface.

Figure 6:
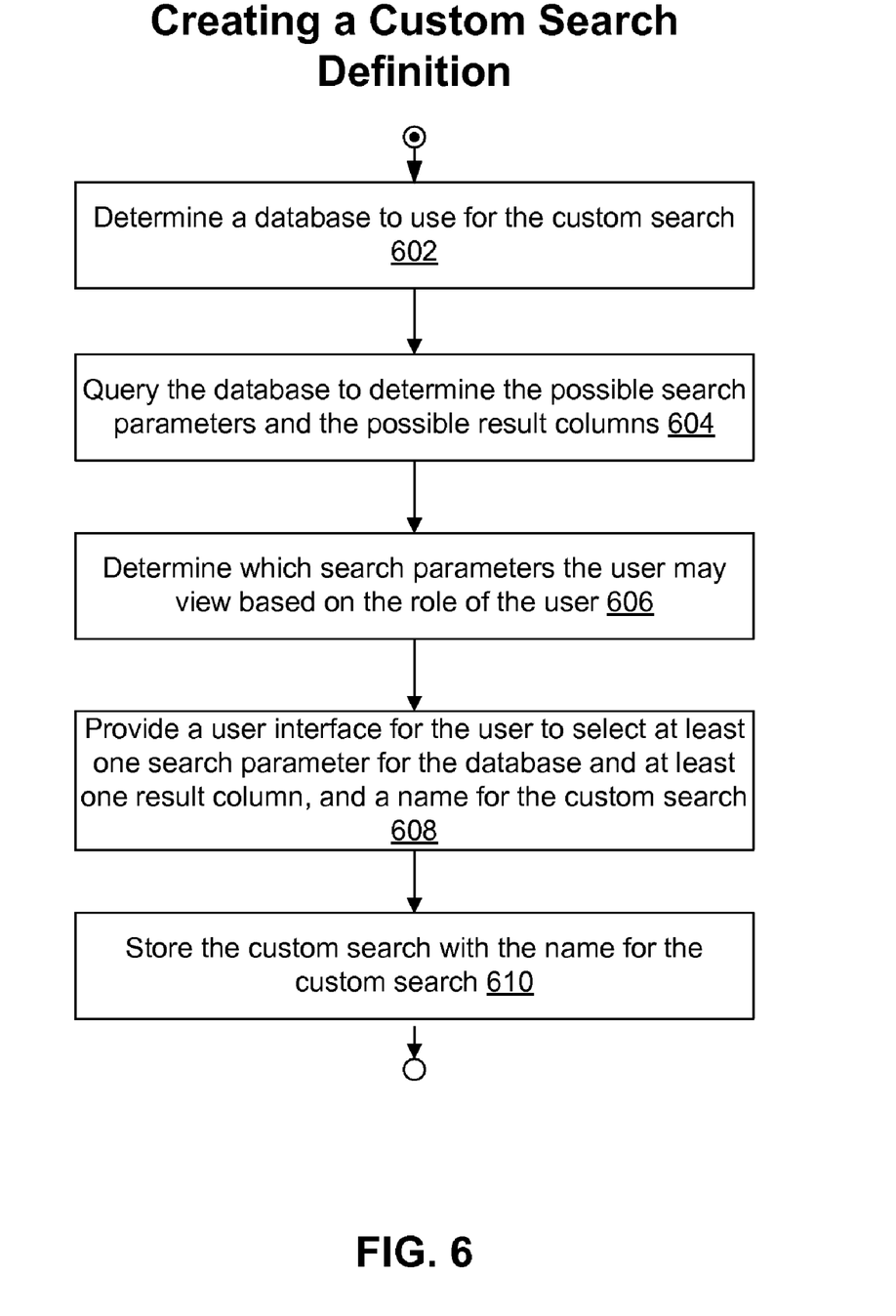
FIG. 6 illustrates one embodiment of a method for creating custom search definitions.

FIG. 6 illustrates one embodiment of a method for creating custom search definitions. The flow begins at 602 with determine a database to use for the custom search. FIG. 1 element 122 illustrates how the database may be selected in one embodiment. The flow continues at 604 with query the database to determine the possible search parameters and the possible result columns 604. The database may be queried to determine all the possible fields that could be used as search parameters. The flow continues at 606 with determine which search parameters the user may view based on the role of the user. The method may query a back-end module to determine based on a role of the user which of all the possible fields could be used for search parameters that the user may view. The fields that the user may not view are excluded. The flow continues at 608 with provide a user interface for the user to select at least one search parameter for the database and at least one result column, and a name for the custom search. FIG. 1 element 124 illustrates a user interface for the user to select at least one search parameter and element 128 illustrates a user interface for the user to provide a name for the custom search. A interface similar to FIG. 1 element 118 may be provided for the user to select result columns for the custom search. The flow continues with 610 store the custom search with the name for the custom search 610. As illustrated in FIG. 3, the search parameter configuration tool 304 may store the custom search definition with a name for the custom search.

Several embodiments of the present invention are specifically illustrated and described herein. However, it will be appreciated that modifications and variations of the present invention are covered by the above teachings and within the purview of the appended claims without departing from the spirit and intended scope of the invention. Several embodiments of the present invention or parts thereof may include a computer readable storage medium, e.g., device 102, back-end system 106, database 110, and others.

What is claimed is:

1. A method on a back-end computer system for building user interfaces for performing custom searches of a database, where access to the database is restricted based on a role for a user comprising:

responsive to receiving at a front-end computer system a name identifying a search definition and the role of the user:
determining on the back-end computer system a target database using the name;
retrieving result fields from the target database using the name;
restricting result fields based on the role of the user,
building a search parameter user interface at the back-end computer system for entering values for search parameters, wherein the search parameters are result fields accessible based on the role of the user,
transmitting the search parameter user interface to the front-end computer system of the user,
receiving the values for the search parameters from the front-end computer system on the back-end computer system,
querying the target database using the received values for the search parameters,
receiving values for the result fields,
building a results user interface at the back-end computer system for viewing the values for the result fields, transmitting the results user interface to the front-end computer system,
providing a user interface for the user to define the search parameters, the result fields, and the name of the custom search, and
storing the search parameters and result fields indexed by the name for the custom search.

2. The method of claim 1, wherein the results user interface and the search parameters user interface are executable by a web browser.

3. The method of claim 1, wherein the database is a database for a customer relations management system.

4. The method of claim 1, wherein the user interface is executable by a web browser.

5. The method of claim 1, further comprising:
restricting the search parameters and the result fields based on the role of the user.

6. The method of claim 1, wherein querying further comprises:
transmitting the received values for the search parameters and the result fields to a proprietary database query module.

7. The method of claim 1, further comprising:
displaying on the front-end system a user interface for the user to select a custom search;
determining the role of the user;
transmitting the selected custom search and the role of the user to the back-end system;
executing an application to display for the user on a front-end system the search parameter user interface;
receiving the user input for the values for the search parameters;
transmitting from the front-end system to the back-end system the values for the search parameters;
receiving the result user interface from the back-end system; and
executing the application to display for the user on the front-end system the results user interface.

8. The method of claim 1, further comprising the step of performing a user authentication.

9. The method of claim 1, wherein the back-end system and the database reside behind a common firewall.

10. A computer system for building user interfaces for performing custom searches of a database, where access to the database is restricted based on a role for a user, comprising:
a custom search application module including an electronic processor, wherein the custom search application module is adapted to respond to receiving at a front-end computer system a name identifying a search definition and the role of the user by and executing on the electronic processor the following method:
determining on the back-end computer system a target database using the name;
retrieving result fields from the target database using the name;
restricting result fields based on the role of the user;
building a search parameter user interface at the back-end computer system for entering values for search parameters, wherein the search parameters are result fields accessible based on the role of the user;
transmitting the search parameter user interface to the front-end computer system of the user;
receiving the values for the search parameters from the front-end computer system on the back-end computer system;
querying the target database using the received values for the search parameters;
receiving values for the result fields;
building a results field user interface at the back-end computer system for viewing the values for the result fields;
transmitting the results user interface to the front-end computer system,
providing a user interface for the user to define the search parameters, the result fields, and the name of the custom search, and
storing the search parameters and result fields indexed by the name for the custom search.

11. The computer system of claim 10, wherein the results user interface and the search parameters user interface are executable by a web browser.

12. The computer system of claim 10, wherein the database is a database for a customer relations management system.

13. The computer system of claim 10, further comprising:
a search parameter configuration tool, wherein the search parameter configuration tool is adapted for:
providing the user interface; and
storing the search parameters and the result fields.

14. The computer system of claim 13, wherein the user interface is executable by a web browser.

15. The computer system of claim 13, wherein the search parameter configuration tool is further adapted for:
restricting the search parameters and the result fields based on the role of the user.

16. The computer system of claim 10, wherein the custom search application module is further adapted for querying by:
transmitting the received values for the search parameters and the result fields to a proprietary database query module.

17. The computer system of claim 10, wherein the search parameter configuration tool is further adapted for:
displaying on the front-end system a user interface for the user to select a custom search;
determining the role of the user;
transmitting the selected custom search and the role of the user to the back-end system;
executing an application to display for the user on a front-end system the search parameter user interface;
receiving the user input for the values for the search parameters;
transmitting from the front-end system to the back-end system the values for the search parameters;
receiving the result field user interface from the back-end system; and
executing the application to display for the user on the front-end system the results field user interface.

18. The computer system of claim 10, wherein the custom search application module is further adapted for querying by:
performing a user authentication.

19. A computer program product, comprising:
a computer-readable storage medium comprising:
a first set of codes for causing a computer system to respond to receiving a name identifying a search definition and a role of a user;
a second set of code for causing a computer to retrieve search parameters and result fields using the name;
a third set of code for causing a computer to restrict search parameters based on the role of the user;
a fourth set of code for causing a computer to build a search parameter user interface for entering values for the search parameters;

a fifth set of code for causing a computer to transmit the search parameter user interface to a front-end computer of the user;

a sixth set of code for causing a computer to receive the values for the search parameters from the front-end computer;

a seventh set of code for causing a computer to restrict the result fields based on the role of the user;

a eighth set of code for causing a computer to query the database using the received values for the search parameters and the result fields;

a ninth set of code for causing a computer to receive values for the result fields;

a tenth set of code for causing a computer to build a results field user interface for viewing the values for the result fields;

a eleventh set of code for causing a computer to transmit the results user interface to the front-end computer;

a twelfth set of code for causing a computer to provide a user interface for the user to define the search parameters, the result fields, and the name of the custom search, and a thirteenth set of code for causing a computer to store the search parameters and result fields indexed by the name for the custom search.

20. A method, comprising:

receiving input from a user on a front-end computer system indicating a desire to define a new search, the input including a name for the search that includes a plurality of data fields;

determining on a back-end computer system a target database using the name;

retrieving the plurality of data fields from the target database;

checking a user role definition associated with the user against each of the plurality of data fields:
 blocking each data field the user role does not provide permission for, and
 presenting on the front-end computer system each data field the user role does provide permission for;

receiving input from the user on the front-end computer system defining the new search, the input including a selection of a plurality of the presented data fields the user role does provide permission for;

automatically constructing a custom search user interface on the back-end computer system based on the selection of the plurality of the presented data fields, wherein the custom search user interface is configured to receive input defining values or value ranges for each data field in the selection of the plurality of the presented data fields;

transmitting the custom search user interface from the back-end computer system to the front-end computer system;

responsive to user input at the custom search user interface at the front-end computer system, defining the values or the value ranges, and responsive to user input indicating a desire to execute a search based on the defined values or value ranges;

constructing a results user interface at the back-end computer system that displays results from the search on the front-end computer system;

providing a user interface for the user to define search parameters, result fields, and the name of the custom search, and storing the search parameters and result fields indexed by the name for the custom search.

* * * * *